(12) United States Patent
Bean

(10) Patent No.: US 12,102,929 B2
(45) Date of Patent: *Oct. 1, 2024

(54) AUDIO COLLISION QUEUE

(71) Applicant: SONY INTERACTIVE ENTERTAINMENT INC., Tokyo (JP)

(72) Inventor: Celeste Bean, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/141,756

(22) Filed: May 1, 2023

(65) Prior Publication Data

US 2023/0271093 A1    Aug. 31, 2023

Related U.S. Application Data

(63) Continuation of application No. 17/487,221, filed on Sep. 28, 2021, now Pat. No. 11,673,064.

(51) Int. Cl.
| | |
|---|---|
| *G06F 15/16* | (2006.01) |
| *A63F 13/53* | (2014.01) |
| *A63F 13/87* | (2014.01) |
| *G06F 3/16* | (2006.01) |
| *G10L 15/08* | (2006.01) |
| *H04L 65/403* | (2022.01) |

(52) U.S. Cl.
CPC .............. *A63F 13/87* (2014.09); *A63F 13/53* (2014.09); *G06F 3/165* (2013.01); *G10L 15/08* (2013.01); *H04L 65/4046* (2013.01); *G10L 2015/088* (2013.01)

(58) Field of Classification Search
CPC .......... A63F 13/87; A63F 13/53; G06F 3/165; G10L 15/08; H04L 65/4046

USPC .................................................. 709/203–204
See application file for complete search history.

(56) References Cited

U.S. PATENT DOCUMENTS

| | | | |
|---|---|---|---|
| 9,666,208 B1 | 5/2017 | Rubin et al. | |
| 11,673,064 B2 | 6/2023 | Bean | |
| (Continued) | | | |

FOREIGN PATENT DOCUMENTS

| | | |
|---|---|---|
| EP | 4385173 | 6/2024 |
| WO | 2023055449 A1 | 4/2023 |

OTHER PUBLICATIONS

PCT Application No. PCT/US2022/034293 International Search Report and Written Opinion dated Oct. 26, 2022.

(Continued)

*Primary Examiner* — Duyen M Doan
(74) *Attorney, Agent, or Firm* — Polsinelli LLP

(57) ABSTRACT

A method and system for setting a vocal collision queue is disclosed. A plurality of incoming audio streams associated with a plurality of user devices currently involved in a communication session is recorded. There is an overlap between portions of two or more of the audio streams in the communication session that is identified. A queue for the two or more identified audio streams is determined. The queue includes a sequence to the identified audio streams. Recordings corresponding to the overlapping portions of the identified audio stream are retrieved. The retrieved recordings are provided to the user devices in the communication session. The retrieved recordings are played sequentially in accordance with the determined sequence.

20 Claims, 7 Drawing Sheets

(56) References Cited

U.S. PATENT DOCUMENTS

| | | | |
|---|---|---|---|
| 11,743,588 B1* | 8/2023 | Shu | G06V 20/44 |
| | | | 348/169 |
| 2010/0013905 A1 | 1/2010 | Kumar et al. | |
| 2013/0249917 A1 | 9/2013 | Fanning et al. | |
| 2013/0250035 A1 | 9/2013 | Murali et al. | |
| 2016/0056787 A1* | 2/2016 | Lu | H04S 7/307 |
| | | | 381/101 |
| 2018/0104587 A1 | 4/2018 | Zachwieja et al. | |
| 2018/0115853 A1* | 4/2018 | Lehtiniemi | G06F 3/165 |
| 2019/0179595 A1* | 6/2019 | De Angelis | G06F 3/165 |
| 2020/0127865 A1 | 4/2020 | Cartwright et al. | |
| 2020/0294482 A1 | 9/2020 | Korbecki | |
| 2022/0131979 A1* | 4/2022 | Pham | H04L 65/1089 |
| 2022/0214859 A1* | 7/2022 | El Ghazzal | G06F 3/165 |
| 2023/0102269 A1 | 3/2023 | Bean | |

OTHER PUBLICATIONS

U.S. Appl. No. 17/487,221 Office Action mailed Oct. 6, 2022.
PCT Application No. PCT/US2022/034293, International Preliminary Report on Patentability dated Apr. 11, 2024.

* cited by examiner

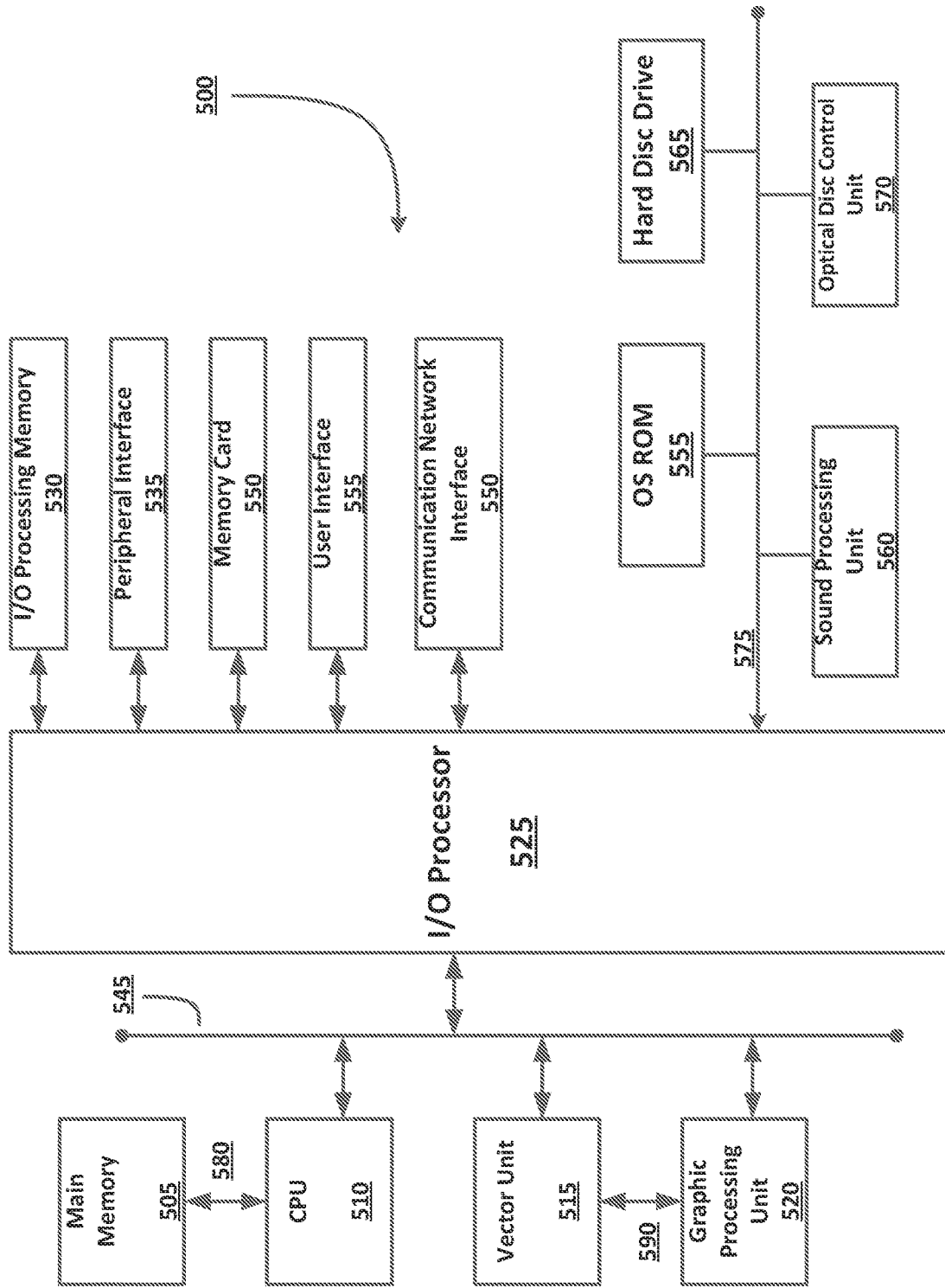

AUDIO COLLISION QUEUE

CROSS-REFERENCE TO RELATED APPLICATION

The present application is a continuation and claims the priority benefit of U.S. patent application Ser. No. 17/487,221 filed Sep. 28, 2021, which is incorporated herein by reference in its entirety.

BACKGROUND OF THE INVENTION

1. Field of Invention

The present invention generally relates to vocal collisions resulting on concurrent speech by multiple individuals. More specifically, the present invention relates to generating and implementing a queue when such vocal collisions are detected.

2. Description of the Related Art

Presently available systems for real-time communications include audio chat or video chat services. Such services may further be provided or associated with ongoing interactive activity. For example, presently available interactive media titles may include or be played concurrently with use of audio conference services by two or more users. Due to a variety of different reasons (e.g., attention being distracted by the virtual environment, system lags), it is quite common for users to speak over each other, resulting in vocal collisions in which speech or other vocal sounds by the users overlap.

Where such vocal collisions occur, the user may be presented with multiple concurrent vocal communications to try to decipher at the same time that gameplay may be ongoing. As a result, each of the players may not comprehend one or more of the overlapping vocal communications. When the interactive media title is a game title and the users are in the middle of gameplay (e.g., an important mission) that requires immediate teamwork and communication, such vocal collisions may contribute to gameplay failures. Some users-particularly those with hearing-loss or other conditions and disabilities affecting hearing and cognition—may find such situations difficult to navigate, thereby adversely affecting their enjoyment and experience with the interactive game title.

Therefore, there is a need to provide a service that detects a vocal collision between audio streams and sets a vocal collision queue based on one of various settings.

SUMMARY OF THE CLAIMED INVENTION

A method for setting a vocal collision queue is disclosed. The method may include recording each of a plurality of incoming audio streams associated with a plurality of user devices currently involved in a communication session, the audio streams recorded in real-time. The method may also include identifying when there is an overlap between portions of two or more of the audio streams in the communication session. The method may further include determining a queue for the two or more identified audio streams, wherein the queue includes a sequence to the identified audio streams. The method may include retrieving recordings corresponding to the overlapping portions of the identified audio streams. The method may include providing the retrieved recordings to the user devices in the communication session, wherein the retrieved recordings are played sequentially in accordance with the determined sequence.

A system for setting a vocal collision queue is disclosed. The system includes a memory and a processor that executes instructions stored in memory, wherein execution of the instructions by the processor may record each of a plurality of incoming audio streams associated with a plurality of user devices currently involved in a communication session, the audio streams recorded in real-time. The execution of the instructions by the processor also may cause to identify when there is an overlap between portions of two or more of the audio streams in the communication session. The execution of the instructions by the processor also may determine a queue for the two or more identified audio streams, wherein the queue includes a sequence to the identified audio streams. The execution of the instructions by the processor also may cause to retrieve recordings corresponding to the overlapping portions of the identified audio streams. The execution of the instructions by the processor also may cause to provide the retrieved recordings to the user devices in the communication session, wherein the retrieved recordings are played sequentially in accordance with the determined sequence.

A non-transitory computer-readable storage medium, having embodied thereon a program executable by a processor to perform a method for setting a vocal collision queue is disclosed. The method may include recording each of a plurality of incoming audio streams associated with a plurality of user devices currently involved in a communication session, the audio streams recorded in real-time. The method may also include identifying when there is an overlap between portions of two or more of the audio streams in the communication session. The method may further include determining a queue for the two or more identified audio streams, wherein the queue includes a sequence to the identified audio streams. The method may include retrieving recordings corresponding to the overlapping portions of the identified audio stream. The method may include providing the retrieved recordings to the user devices in the communication session, wherein the retrieved recordings are played sequentially in accordance with the determined sequence.

BRIEF DESCRIPTION OF THE DRAWINGS

FIG. 5 is a block diagram of an exemplary electronic entertainment system, according to some aspects of the present disclosure.

DETAILED DESCRIPTION

Embodiments of the present invention include systems and methods for setting a vocal collision queue. The method may include recording each of a plurality of incoming audio streams associated with a plurality of user devices currently involved in a communication session, the audio streams recorded in real-time. The method may also include identifying when there is an overlap between portions of two or more of the audio streams in the communication session. The method may further include determining a queue for the two or more identified audio streams, wherein the queue includes a sequence to the identified audio streams. The method may include retrieving recordings corresponding to the overlapping portions of the identified audio streams. The method may include providing the retrieved recordings to the user devices in the communication session, wherein the retrieved recordings are played sequentially in accordance with the determined sequence.

Figure 1:
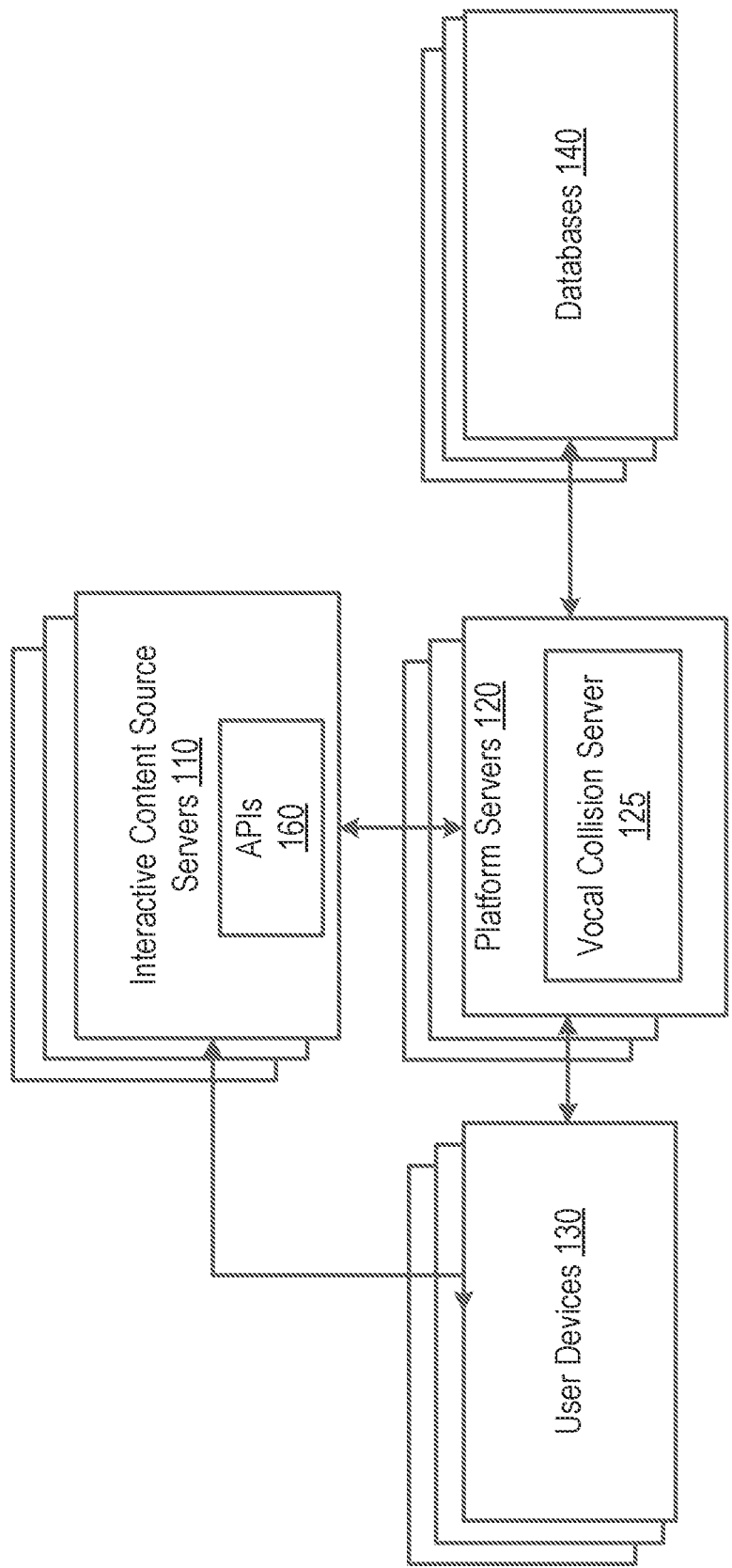
FIG. 1 illustrates an exemplary network environment in which a system for providing vocal collision queues may be implemented.

FIG. 1 illustrates an exemplary network environment in which a system for setting a vocal collision queue may be implemented. The network environment 100 may include one or more interactive content servers 110 that provide streaming content (e.g., interactive video, podcasts, etc.), one or more platform servers 120 including vocal collision server 125, one or more user devices 130, and one or more databases 140.

Interactive content source servers 110 may maintain, stream, and host a variety of digital content (including interactive media content) and digital services available for distribution over a communication network. Such interactive content source servers 110 may be implemented in the cloud (e.g., one or more cloud servers). The interactive content source servers 110 may be associated with any content provider that makes its content available for access over a communication network. The interactive content source servers 110 may therefore host a variety of different content titles, which may further have be associated with object data regarding a digital or virtual object (e.g., activity information, zone information, character information, player information, other game media information, etc.) displayed in a digital or virtual environment during an interactive session. Each media title hosted by interactive content source servers 110 may include one or more sets of object data that may be available for participation with (e.g., viewing or interacting with an activity) by a user. Data about the object shown in the media may be stored by the media streaming servers 110, platform servers 120 and/or the user device 130, in an object file 216 ("object file"), as will be discussed in detail with respect to FIGS. 2A-2B.

Such digital content hosted by interactive content source servers 110 may include not only digital video and games, but also other types of digital applications and services. Such applications and services may include any variety of different digital content and functionalities that may be provided to user devices 150, including providing and supporting chat and other communication channels. The chat and communication services may be inclusive of voice-based, text-based, and video-based messages. Thus, a user device 130 may participate in a gameplay session concurrent with one or more communication sessions, and the gameplay and communication sessions may be hosted on one or more of the interactive content source servers 110.

The platform servers 120 may be responsible for communicating with the different interactive content servers 110, databases 140, and user devices 130. Such platform servers 120 may be implemented on one or more cloud servers. The streaming servers 110 may communicate with multiple platform servers 120, though the media streaming servers 110 may be implemented on one or more platform servers 120. The platform servers 120 may also carry out instructions, for example, receiving a user request from a user to stream streaming media (i.e., games, activities, video, podcasts, User Generated Content ("UGC"), publisher content, etc.). The platform servers 120 may further carry out instructions, for example, for streaming the streaming media content titles. Such streaming media may have at least one object set associated with at least a portion of the streaming media. Each set of object data may have data about an object (e.g., activity information, zone information, mechanic information, game media information, etc.) displayed during at least a portion of the streaming media.

The platform servers 120 may include a vocal collision server 125 that receives incoming audio streams associated with a plurality of user devices involved in a communication session. When there is an overlap between portions of two or more of the audio streams in the communication session, the vocal collision server 125 may identify the overlap and determine a queue for the two or more identified audio streams. In some cases, the vocal collision server 125 may mute the sounds of the collided audio streams at the user devices, such that no one hears the garbled audio streams. The vocal collision server 125 may further retrieve the recorded audio streams associated with overlapping portions of the audio stream and play them in sequential order based on a determined queue. In some embodiments, the vocal collision server 125 may generate a display that visually presents the determined queue and provide such display to user devices in the communication session. The displayed queue may further include transcription of audio streams. The transcription may be displayed in a swimming lane diagram as illustrated in FIG. 4B.

The streaming media and the associated at least one set of object data may be provided through an application programming interface (API) 160, which allows various types of media streaming servers 110 to communicate with different platform servers 120 and different user devices 130. API 160 may be specific to the particular computer programming language, operating system, protocols, etc., of the media streaming servers 110 providing the streaming media content titles, the platform servers 120 providing the media and the associated at least one set of object data, and user devices 130 receiving the same. In a network environment 100 that includes multiple different types of media streaming servers 110 (or platform servers 120 or user devices 130), there may likewise be a corresponding number of APIs 160.

The user device 130 may include a plurality of different types of computing devices. For example, the user device 130 may include any number of different gaming consoles, mobile devices, laptops, and desktops. In another example, the user device 130 may be implemented in the cloud (e.g., one or more cloud servers). Such user device 130 may also be configured to access data from other storage media, such as, but not limited to memory cards or disk drives as may be appropriate in the case of downloaded services. Such devices 130 may include standard hardware computing components such as, but not limited to network and media interfaces, non-transitory computer-readable storage (memory), and processors for executing instructions that may be stored in memory. These user devices 130 may also run using a variety of different operating systems (e.g., iOS, Android), applications or computing languages (e.g., C++, JavaScript). The user device may include one or more devices associated with a user or a user device capable of displaying on one or more screens.

The databases 140 may be stored on the platform servers 120, the media streaming servers 110, any of the servers 218 (shown in FIGS. 2A-2B), on the same server, on different servers, on a single server, across different servers, or on any of the user devices 130. Such databases 140 may store the streaming media and/or an associated set of object data. Such streaming media may depict one or more objects (e.g., activities) that a user can participate in or interact with. One or more user profiles may also be stored in the databases 140. Each user profile may include information about the user (e.g., user progress in an activity and/or media content title, user id, user game characters, etc.) and may be associated to media.

In an exemplary embodiment of the present invention, platform servers 120 may capture audio data during current gameplay sessions. One current gameplay session may include a user using user device 130 to access and engage with an interactive content title hosted by interactive content servers 110. During gameplay of a particular game title, for example, platform servers 120 may record gameplay data (including audio, video, metadata regarding in-game status and actions, etc.) sufficient to recreate the gameplay of a current gameplay session in a future gameplay session. The audio data may be retrieved during gameplay to be played in a sequenced based on a determined queue when there is an overlap between portions of two or more audio streams. One of the audio streams may be associated with a current gameplay session. For example, the audio from the gameplay session, such as those by non-player characters (NPC) or voiceover narration, may be added into the determined queue if there is an overlap between an NPC and one or more of the players. The audio data may be stored in database(s) 140.

In an exemplary implementation, databases 140 may store recorded incoming audio streams associated with a plurality of user devices involved in a communication session, which may be linked to a gameplay session. The audio streams may be recorded in real-time. An overlap between portions of two or more of the audio streams in the communication session may be identified and a queue may be determined. The queue may include a sequence to the identified audio streams. The sequence may be determined by random selection, a designated host, keywords or key phrases, or speaking times, wherein users who have already spoken a lot are placed lower in the queue. The recordings corresponding to the overlapping portions of the identified audio streams may be retrieved and provided to the user devices in the communication session. The retrieved recordings may then be played sequentially in accordance with the determined sequence.

In an exemplary implementation, a display that visually presents the determined queue may be generated and provided to the user devices in the communication session. After a set period of time, or after all of the provided recordings have been played, the queue may be removed from the display. The displayed queue may further include transcription of all the audio streams that visually shows the sequence. The displayed queue may include the transcription displayed in a swimming lane diagram, or in a visual format that depicts which user spoke which transcribed statements that were overlapped.

In some examples, a displayed option to claim control over the communication session to at least one of the user devices may be provided. A displayed option to claim control over the communication session to at least one of the user devices after another user device relinquishes control may also be provided. Alternatively, a displayed option for at least one of user devices to indicate an urgency level of an associated one of the audio streams may be provided and the audio stream associated with the indicated urgency level within the queue may be prioritized.

In some examples, the communication session is associated with a current gameplay session of an interactive content title. The communication session may incorporate an audio stream associated with the current gameplay session into the queue. The audio stream from the gameplay session may include recordings of other characters or narrators of a respective interactive content title, wherein the recordings that overlap with audio streams of players may result in adding an audio stream from the interactive content title to a determined queue.

Figure 2A:
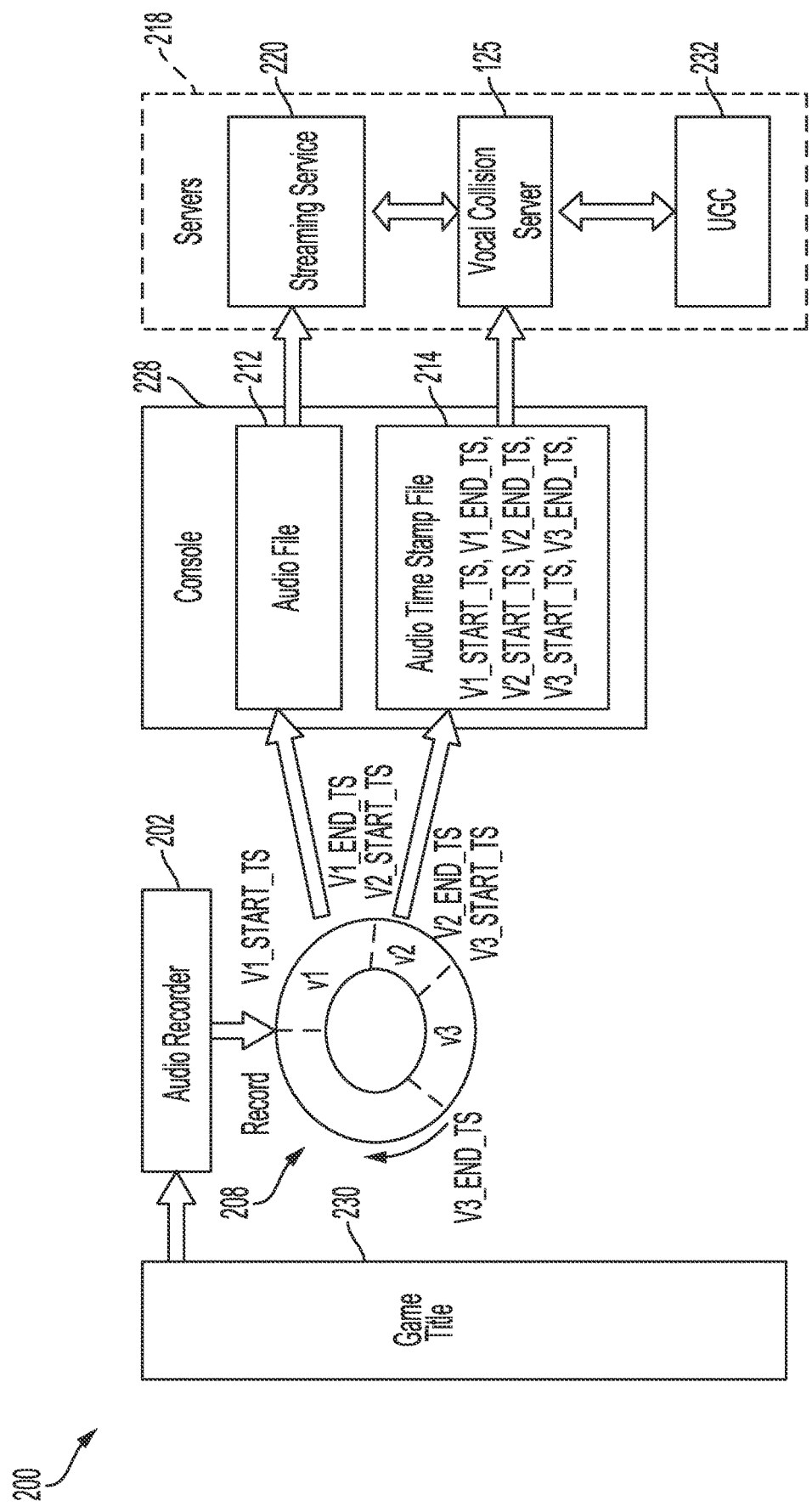
FIG. 2A illustrates an exemplary uniform data system (UDS) that may be used to provide data to a system for setting a vocal collision queue via an audio recorder.
Figure 2B:
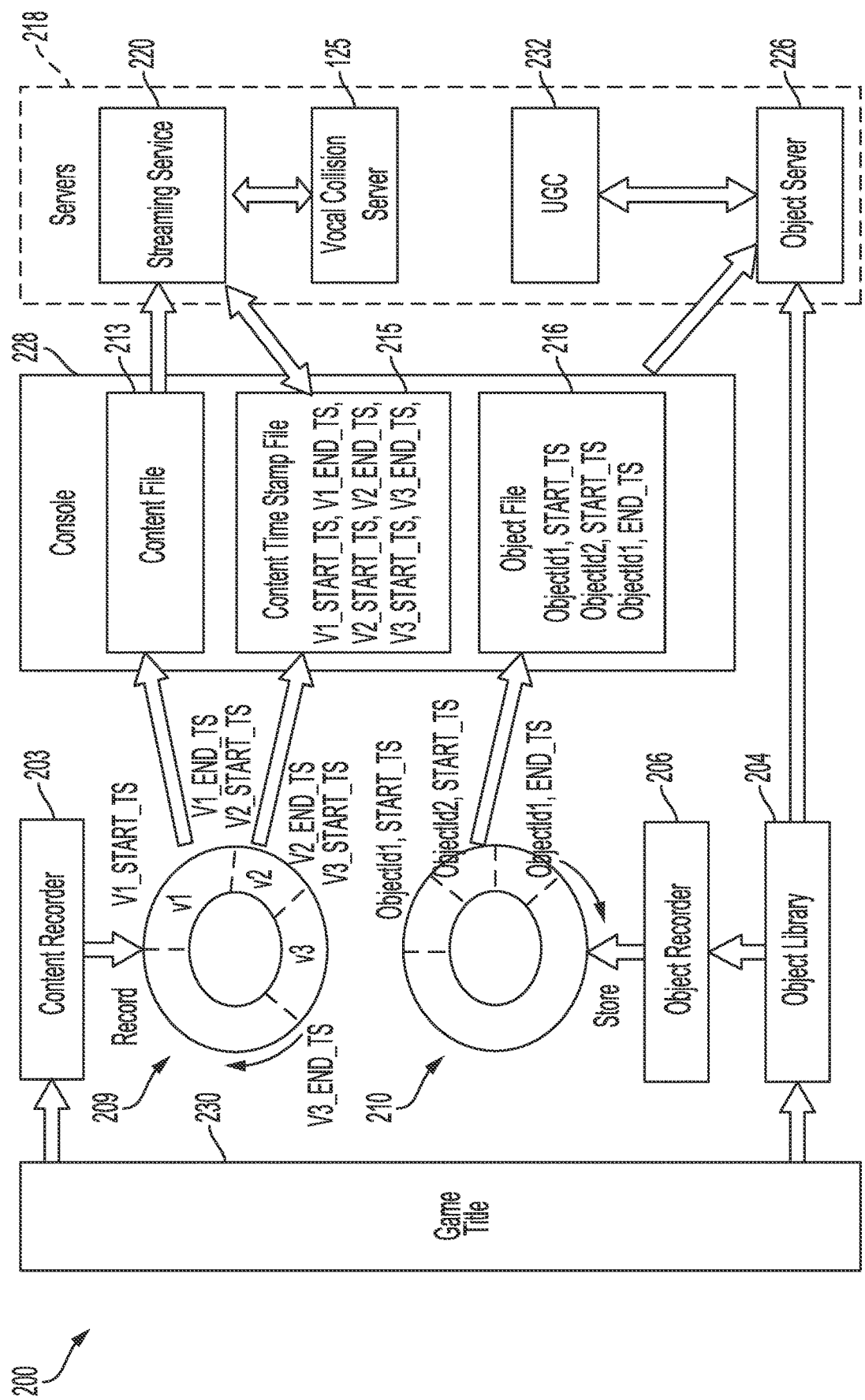
FIG. 2B illustrates an exemplary uniform data system (UDS) that may be used to provide data to a system for setting a vocal collision queue via a content recorder.

FIG. 2A illustrates an exemplary uniform data system (UDS) that may be used to provide data to a system for setting a vocal collision queue via an audio recorder, while FIG. 2B illustrates an exemplary uniform data system (UDS) that may be used to provide data to a system for setting a vocal collision queue via a content recorder. Based on data provided by UDS, the vocal collision server 125 can be made aware of when recorded audio streams are overlapping and determine a queue for playing the recorded audio streams. Furthermore, each user interaction may be associated the metadata for the type of in-game interaction, location within the in-game environment, and point in time within an in-game timeline, as well as other players, objects, entities, etc., involved. Thus, metadata can be tracked for any of the variety of user interactions that can occur in during a game session, including associated activities, entities, settings, outcomes, actions, effects, locations, and character stats. Such data may further be aggregated, applied to data models, and subject to analytics. Such a UDS data model may be used to assign contextual information to each portion of information in a unified way across games.

As illustrated in FIG. 2A, an exemplary console 228 (e.g., a user device 130) and exemplary servers 218 (e.g., streaming server 220, the vocal collision server 125, a user-generated content (UGC) server 232, and an object server 226) are shown. In one example, the console 228 may be implemented on the platform servers 120, a cloud server, or on any of the servers 218. In an exemplary example, an audio recorder 202 may be implemented on the platform servers 120, a cloud server, or on any of the servers 218. Such audio recorder 202 receives and records audio (e.g., audio files) from an interactive content title 230 onto an audio ring-buffer 208. Such ring-buffer 208 may store multiple audio segments (e.g., v1, v2 and v3), start times for each segment (e.g., V1_START_TS, V2_START_TS, V3_START_TS), and end times for each segment (e.g., V1_END_TS, V2_END_TS, V3_END_TS). The audio segments may be stored as an audio file (e.g., MP3, etc.) and may further include an audio file 212 by the console 228. Such audio files 212 may be uploaded to the streaming server 220 for storage and subsequent streaming or use, though the audio files 212 may be stored on any server, a cloud server, any console 228, or any user device 130. Such start times and end times for each segment may be stored as an audio time stamp file 214 by the console 228. Such content time stamp file 214 may also include a streaming ID, which matches a streaming ID of the media file 212, thereby associating the audio time stamp file 215 to the audio file 213. Such audio time stamp file 214 may be sent to the vocal collision server 125 and/or the UGC server 232, though the audio time stamp file 214 may be stored on any server, a cloud server, any console 228, or any user device 130.

Similar to FIG. 2A, FIG. 2B illustrates a recorder (e.g., content recorder 203), which may be implemented on the platform servers 120. The content recorder 203 may receive and record content files 213 onto a content ring buffer 209 that can store multiple content segments, which may be stored as a media file (e.g., MP4, WebM, etc.) by the console 228. Such content files 213 may be uploaded to the streaming server 220 for storage and subsequent streaming or use, though the content files 213 may be stored on any server, a cloud server, any console 228, or any user device 130. Such start times and end times for each segment may be stored as a content time stamp file 214 by the console 228. Such content time stamp file 215 may also include a streaming ID, which matches a streaming ID of the media file 212, thereby associating the content time stamp file 214 to the media file 212. Such content time stamp file 215 may be sent to the vocal collision server 125 and/or the UGC server 232, though the content time stamp file 215 may be stored on any server, a cloud server, any console 228, or any user device 130.

Concurrent to the content recorder 203 receiving and recording content from the interactive content title 230, an object library 204 receives data from the interactive content title 230, and an object recorder 206 tracks the data to determine when an object begins and ends. The object library 204 and the object recorder 206 may be implemented on the platform servers 120, a cloud server, or on any of the servers 218. When the object recorder 206 detects an object beginning, the object recorder 206 receives object data (e.g., if the object were an activity, user interaction with the activity, activity ID, activity start times, activity end times, activity results, activity types, etc.) from the object library 204 and records the object data onto an object ring-buffer 210 (e.g., ObjectID1, START_TS; ObjectID2, START_TS; ObjectID3, START_TS). Such object data recorded onto the object ring-buffer 210 may be stored in the object file 216. Such object file 216 may also include activity start times, activity end times, an activity ID, activity results, activity types (e.g., tutorial interaction, menu access, competitive match, quest, task, etc.), user or peer data related to the activity. For example, an object file 216 may store data regarding an in-game skill used, an attempt to use a skill, or success or failure rate of using a skill during the activity. Such object file 216 may be stored on the object server 226, though the object file 216 may be stored on any server, a cloud server, any console 228, or any user device 130.

Such object data (e.g., the object file 216) may be associated with the content data (e.g., the media file 212 and/or the content time stamp file 214). In one example, the UGC server 232 stores and associates the content time stamp file 214 with the object file 216 based on a match between the streaming ID of the content time stamp file 214 and a corresponding activity ID of the object file 216. In another example, the object server 226 may store the object file 216 and may receive a query from the UGC server 232 for an object file 216. Such query may be executed by searching for an activity ID of an object file 216 that matches a streaming ID of a content time stamp file 214 transmitted with the query. In yet another example, a query of stored content time stamp files 214 may be executed by matching a start time and end time of a content time stamp file 214 with a start time and end time of a corresponding object file 216 transmitted with the query. Such object file 216 may also be associated with the matched content time stamp file 214 by the UGC server 232, though the association may be performed by any server, a cloud server, any console 228, or any user device 130. In another example, an object file 216 and a content time stamp file 214 may be associated by the console 228 during creation of each file 216, 214. The activity files captured by UDS 200 may be accessed by the platform servers 120 as to the user, the game title, the specific activity being engaged by the user in a game environment of the game title, and similar users, game titles, and in-game activities.

Figure 3:
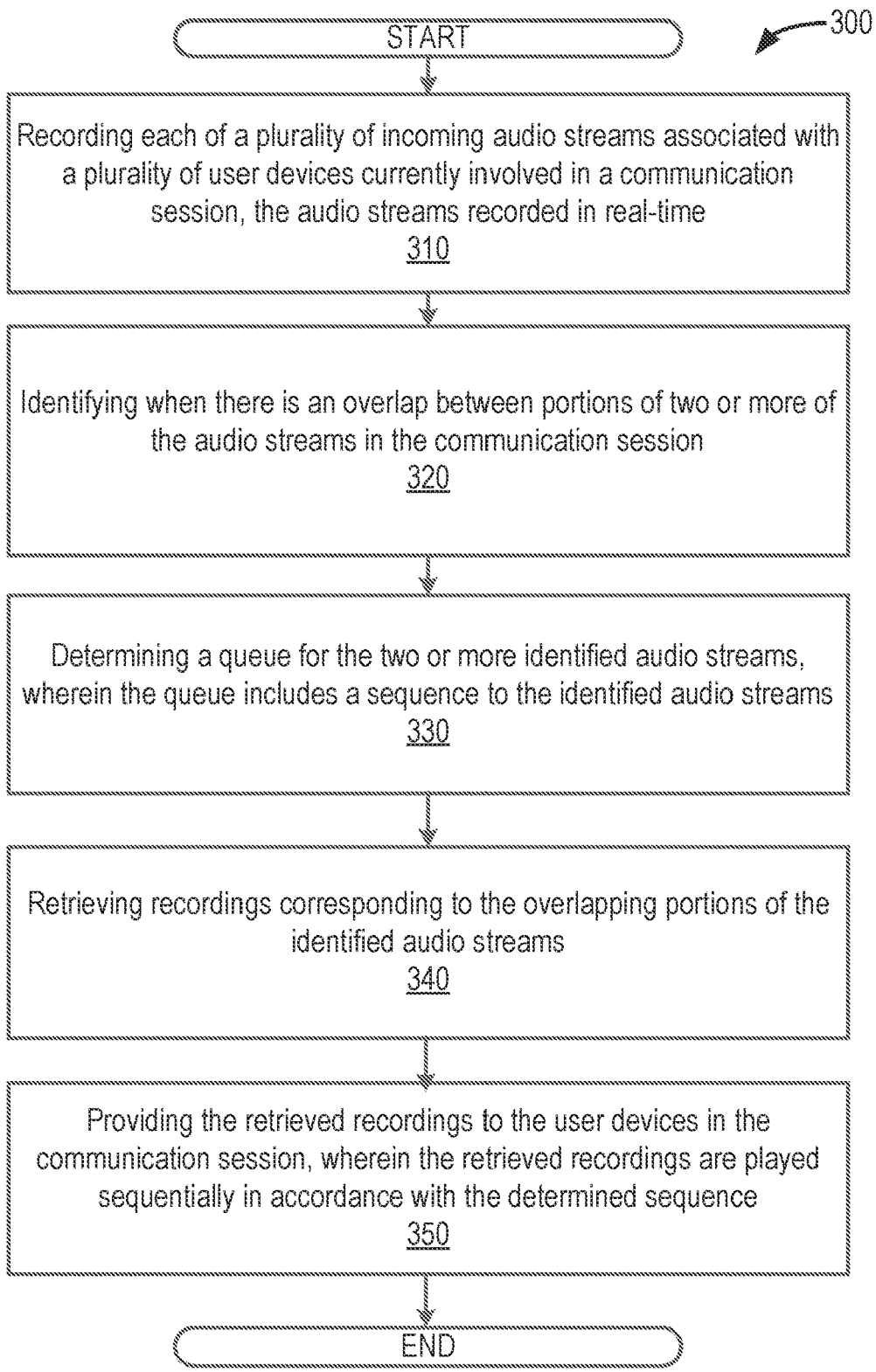
FIG. 3 is a flowchart illustrating an exemplary method for providing vocal collision queues.

FIG. 3 is a flowchart illustrating an exemplary method 300 for setting a vocal collision queue, according to some aspects of the present disclosure. The steps identified in FIG. 3 are exemplary and may include various alternatives, equivalents, or derivations thereof including but not limited to the order of execution of the same. The steps of the process of FIG. 3 and any alternative similar processes may be embodied in hardware or software including a computer-readable storage medium including instructions executable by the likes of a processor in a computing device.

In step 310, each of a plurality of incoming audio streams associated with a plurality of user devices currently involved in a communication session may be recorded. The audio streams may be recorded in real-time. The communication session may be linked to a gameplay session or a lead session that can be configured to play various game sessions, as well as keeping various players in the lead session while switching between game session. The audio streams may be recorded via the audio recorder 202 and/or the content recorder 203 and stored in association with timestamp files to retrieve recording when identified as corresponding to overlapping portions.

In step 320, when there is an overlap between portions of two or more of the audio streams in the communication session, the overlap may be identified. A determination may be made regarding which audio streams associated with which user accounts have overlap in audio so that relevant identifiers may be recorded and used to retrieve the corresponding portions of audio streams. In some cases, when two users speak at the same time, they may stop speaking immediately when they noticed the vocal collision. In other cases, the two players may be too focused on gameplay to notice or there may be lag in delivering the other player's audio that a player may speak entire statements. As such, it is frustrating for both the player who was speaking as well as other players who had no idea what was said and by whom.

In step 330, a queue for the two or more identified audio streams may be determined. The queue may include a sequence to the identified audio streams. For example, the queue may be determined by random selection or a designated host. Alternatively, the queue may be determined based on speaking times, wherein users who have already spoken a lot are placed lower in the queue. This could be in a current session or in a current session as well as across past sessions. Furthermore, the queue may be determined based on key words or phrases, such as giving deference to exclamatory statements. The queue may be determined in any number of methods, or may even be learned via machine learning, so long as equity and logic persists in determining the queue. Furthermore, the queue may be removed from the display after a set period of time or after all of the provided recordings have been played.

In step 340, recordings corresponding to the overlapping portions of the identified audio streams may be retrieved. The recordings may be extrapolated from content files 213 or may be retrieved as audio files 212. The recordings may continue until a sentence is completed in an example where a player's speech overlaps that of another player who eventually stopped speaking. In order to present a player's speech in a comprehensible way, the recording may include contextual portions that are not part of the overlap, so that the thought that is conveyed is complete.

In step 350, the retrieved recordings to the user devices in the communication session may be provided. The retrieved recordings may be played sequentially in accordance with the determined sequence. In some embodiments, a display that visually presents the determined queue may be generated. The display to the user devices may be presented in the communication session. The displayed queue may simply indicate the order in which the recordings will be played. The displayed queue may further indicate who may speak after the recordings will be played so that the players may follow up their thoughts. The display queue may be provided in addition to an option for the players to "raise their hand" to continue a conversation or claim control over the communication session to at least one of the user devices. For example, a displayed option to claim control over the communication session to at least one of the user devices may be provided. The displayed option to claim control over the communication session may be provided after another user device has relinquished control. The displayed option may indicate an urgency level of an associated one of the audio streams. The urgency level may be determined based on the content of what was said or self-proclaimed afterwards by a respective player. The audio stream associated with the indicated urgency level within the queue may be prioritized.

In some embodiments, the displayed queue may include a transcription of some or all of the audio streams that visually shows the sequence. In some cases, the displayed queue may include the transcription displayed in a swimming lane diagram to depict the overlapping audio streams. The audio streams with indicated urgency may be bolded, highlighted, or emphasized. Furthermore, the communication session may be associated with a current gameplay session of an interactive content title, and an audio stream associated with the current gameplay session may be incorporated into the queue. For example, if there were audio associated with a non-player character speaking and that overlapped with an audio stream of one of the players, the audio of the NPC may be repeated in the queue.

Figure 4A:
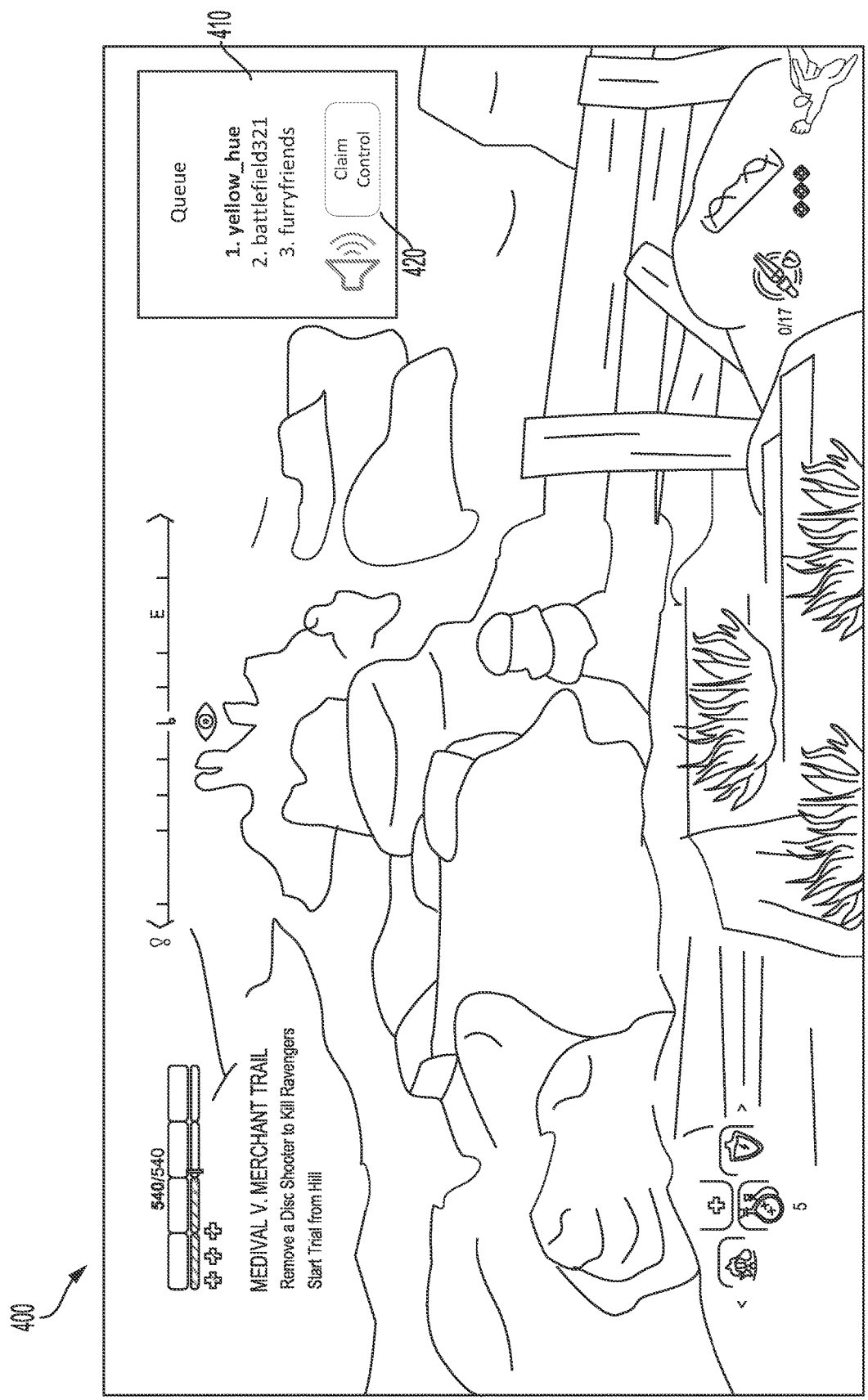
FIG. 4A illustrates an exemplary graphical user interface (GUI) in which detection of a vocal collision may trigger a queue.
Figure 4B:
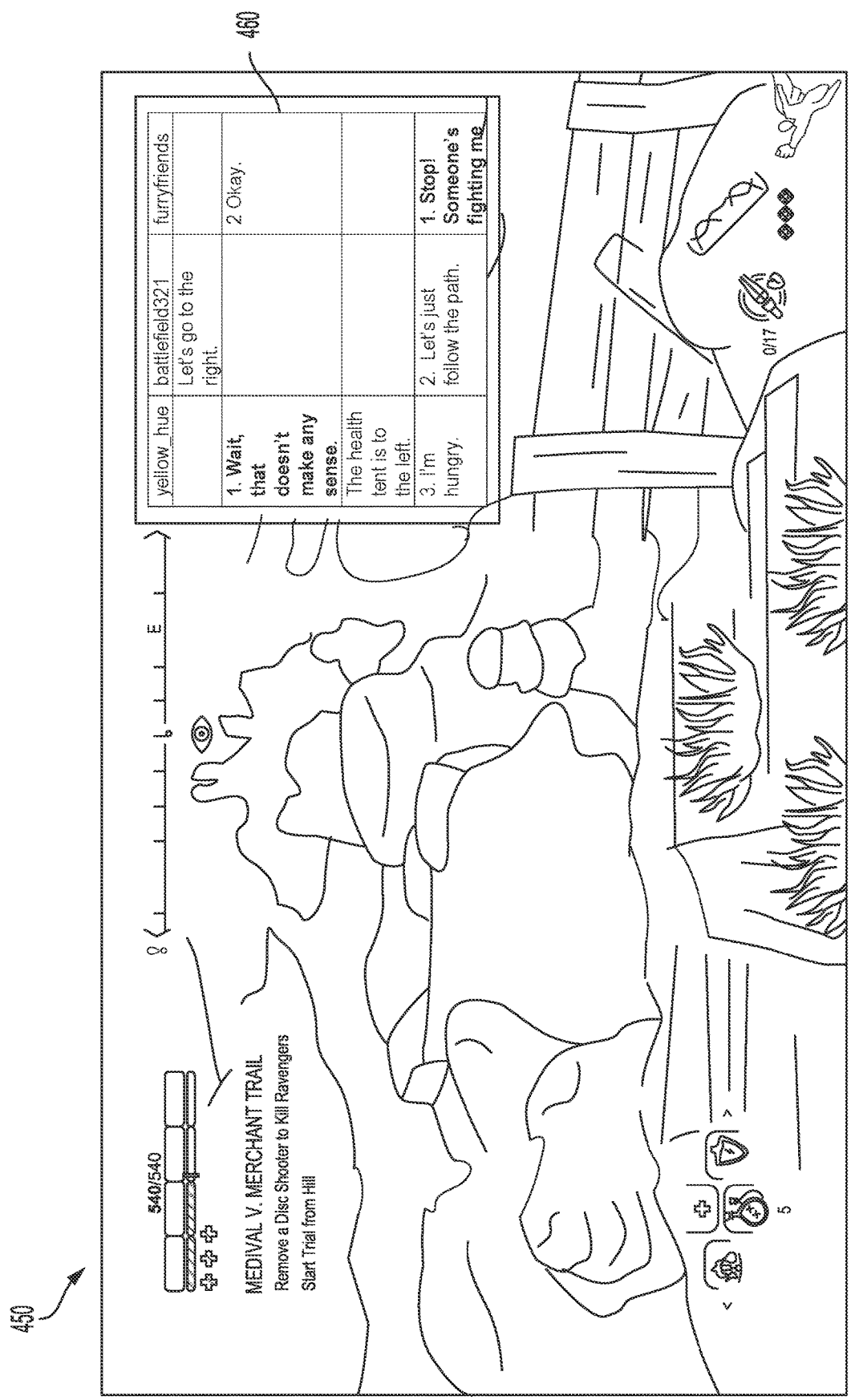
FIG. 4B illustrates an exemplary graphical user interface (GUI) in which a queue with transcription is presented in a swimming lane diagram.

FIG. 4A illustrates an exemplary graphical user interface (GUI) 400 in which a determined queue 410 is presented. The determined queue 410 may be displayed as a list of player usernames that indicate an order for the players to speak after there is a vocal collision. The overlapping audio streams may be replayed, with an emphasis on which player's recording is currently being played. Then, those players may claim control of a communication session between the players to follow up on their thoughts, by selecting a "claim control" button 420, and or may disclaim their control for a next player in the queue to speak.

FIG. 4B illustrates an exemplary graphical user interface (GUI) 450 in which a determined queue with transcription is presented in a swimming lane diagram 460. The swimming lane diagram 460 may display the latest portion of the conversation between the players, including the last overlapping portions, along with indication of which of the overlapping audio streams received priority in the queue. The priority may be based on random selection, a predefined designation, a total speaking times between the players, keywords or exclamation indicating urgency, etc. By displaying the swimming lane diagram 460 or similar kinds of diagrams that indicate what players are saying and allowing the overlapping portions to be parsed out visually, the visualized queue may provide another means for better communication between the players. The visualized queue or swimming lane diagram 460 may disappear or fade out when there are no overlapping portions in the audio stream and only reappear when there is another overlap, along with statements spoken just before the overlap to give context.

FIG. 5 is a block diagram of an exemplary electronic entertainment system that may be used in embodiments of the present invention. The entertainment system 500 of FIG. 5 includes a main memory 505, a central processing unit (CPU) 510, vector unit 515, a graphics processing unit 520, an input/output (I/O) processor 525, an I/O processor memory 530, a controller interface 535, a memory card 540, a Universal Serial Bus (USB) interface 545, and an IEEE interface 550. The entertainment system 500 further includes an operating system read-only memory (OS ROM) 555, a sound processing unit 560, an optical disc control unit 570, and a hard disc drive 565, which are connected via a bus 575 to the I/O processor 525.

Entertainment system 500 may be an electronic game console. Alternatively, the entertainment system 500 may be implemented as a general-purpose computer, a set-top box, a hand-held game device, a tablet computing device, or a mobile computing device or phone. Entertainment systems may contain more or less operating components depending on a particular form factor, purpose, or design.

The CPU 510, the vector unit 515, the graphics processing unit 520, and the I/O processor 525 of FIG. 5 communicate via a system bus 555. Further, the CPU 510 of FIG. 5 communicates with the main memory 505 via a dedicated bus 580, while the vector unit 515 and the graphics processing unit 520 may communicate through a dedicated bus 590. The CPU 510 of FIG. 5 executes programs stored in the OS ROM 555 and the main memory 505. The main memory 505 of FIG. 5 may contain pre-stored programs and programs transferred through the I/O Processor 525 from a CD-ROM, DVD-ROM, or other optical disc (not shown) using the optical disc control unit 570. I/O Processor 525 of FIG. 5 may also allow for the introduction of content transferred over a wireless or other communications network (e.g., LTE, 3G, and so forth). The I/O processor 525 of FIG. 5 primarily controls data exchanges between the various devices of the entertainment system 500 including the CPU 510, the vector unit 515, the graphics processing unit 520, and the controller interface 535.

The graphics processing unit 520 of FIG. 5 executes graphics instructions received from the CPU 510 and the vector unit 515 to produce images for display on a display device (not shown). For example, the vector unit 515 of FIG. 5 may transform objects from three-dimensional coordinates to two-dimensional coordinates, and send the two-dimensional coordinates to the graphics processing unit 520. Furthermore, the sound processing unit 560 executes instructions to produce sound signals that are outputted to an audio device such as speakers (not shown). Other devices may be connected to the entertainment system 500 via the USB interface 545, and the IEEE 594 interface 550 such as wireless transceivers, which may also be embedded in the system 500 or as a part of some other component such as a processor.

A user of the entertainment system 500 of FIG. 5 provides instructions via the controller interface 535 to the CPU 510. For example, the user may instruct the CPU 510 to store certain game information on the memory card 540 or other non-transitory computer-readable storage media or instruct a character in a game to perform some specified action.

The present invention may be implemented in an application that may be operable by a variety of end user devices. For example, an end user device may be a personal computer, a home entertainment system (e.g., Sony PlayStation2® or Sony PlayStation3® or Sony PlayStation4® or Sony PlayStation5®), a portable gaming device (e.g., Sony PSP® or Sony Vita®), or a home entertainment system of a different albeit inferior manufacturer. The present methodologies described herein are fully intended to be operable on a variety of devices. The present invention may also be implemented with cross-title neutrality wherein an embodiment of the present system may be utilized across a variety of titles from various publishers.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for providing audio queues, the method comprising:
   monitoring each of a plurality of incoming audio streams associated with a plurality of user devices currently involved in a gameplay session in real-time;
   detecting an overlap between portions of two or more of the plurality of incoming audio streams;
   prioritizing at least one of the portions that is associated with an urgency level related to a current gameplay objective, wherein the at least one portion is prioritized within a prioritized sequence of the portions;
   retrieving recordings corresponding to the portions of the two or more incoming audio streams; and
   presenting the recordings in the prioritized sequence to the plurality of user devices in the gameplay session, wherein presenting the recordings includes playing the recordings sequentially in accordance with the prioritized sequence.

2. The method of claim 1, further comprising assessing the urgency level of the at least one portion based on one or more keywords present in the at least one portion.

3. The method of claim 1, further comprising assessing the urgency level of the at least one portion based on one or more exclamatory statements present in the at least one portion.

4. The method of claim 1, wherein prioritizing the at least one portion within the prioritized sequence is further based on a machine learning model.

5. The method of claim 4, wherein the machine learning model further includes aggregated metadata regarding in-game interactions associated with the gameplay session.

6. The method of claim 1, further comprising assessing the urgency level of the at least one portion based on a statement made in one or more subsequent portions.

7. The method of claim 1, further comprising generating the prioritized sequence of the portions based on respective urgency levels of each of the portions in relation to the current gameplay objective.

8. The method of claim 1, wherein prioritizing the at least one portion within the prioritized sequence is further based on a pre-defined designation associated with the gameplay session.

9. The method of claim 1, further comprising:
   generating an overlay for display at one or more of the user devices in the gameplay session, the overlay presenting the prioritized sequence of the overlapping portions; and
   emphasizing the at least one portion within the overlay based on the urgency level related to the current gameplay objective.

10. The method of claim 9, further comprising generating a transcription of the at least one portion for display within the overlay.

11. A system for providing audio queues, the system comprising:
    a communication interface that communicates over a communication network, wherein the communication interface receives a plurality of incoming audio streams associated with a plurality of user devices currently involved in a gameplay session in real-time during the gameplay session; and
    a processor in communication with a memory and the communication interface, wherein the processor executes instructions stored in the memory to:
    monitor each of the audio streams during the gameplay session in real-time;
    detect an overlap between portions of two or more of the plurality of incoming audio streams;
    prioritize at least one of the portions that is associated with an urgency level related to a current gameplay objective, wherein the at least one portion is prioritized within a prioritized sequence of the portions;
    retrieve recordings corresponding to the portions of the two or more incoming audio streams; and
    present the recordings in the prioritized sequence to the plurality of user devices in the gameplay session, wherein presenting the recordings includes playing the recordings sequentially in accordance with the prioritized sequence.

12. The system of claim 11, wherein the processor executes further instructions to assess the urgency level of the at least one portion based on one or more keywords present in the at least one portion.

13. The system of claim 11, wherein the processor executes further instructions to assess the urgency level of the at least one portion based on one or more exclamatory statements present in the at least one portion.

14. The system of claim 11, wherein prioritizing the at least one portion within the prioritized sequence is further based on a machine learning model.

15. The system of claim 14, wherein the machine learning model further includes aggregated metadata regarding in-game interactions associated with the gameplay session.

16. The system of claim 11, wherein the processor executes further instructions to assess the urgency level of the at least one portion based on a statement in one or more subsequent portions.

17. The system of claim 11, wherein the processor executes further instructions to generate the prioritized sequence of the portions based on respective urgency levels of each of the portions in relation to the current gameplay objective.

18. The system of claim 17, wherein prioritizing the at least one portion within the prioritized sequence is further based on a pre-defined designation associated with the gameplay session.

19. The system of claim 11, wherein the processor executes further instructions to:

generate an overlay for display at one or more of the user devices in the gameplay session, the overlay presenting the prioritized sequence of the overlapping portions; and emphasize the at least one portion within the overlay based on the urgency level related to the current gameplay objective.

20. A non-transitory, computer-readable storage medium having instructions embodied thereon, the instructions executable by a computing system to perform a method for providing an audio queue, the method comprising:

monitoring each of a plurality of incoming audio streams associated with a plurality of user devices currently involved in a gameplay session in real-time;

detecting an overlap between portions of two or more of the plurality of incoming audio streams;

prioritizing at least one of the portions that is associated with an urgency level related to a current gameplay objective, wherein the at least one portion is prioritized within a prioritized sequence of the portions;

retrieving recordings corresponding to the portions of the two or more incoming audio streams; and presenting the recordings in the prioritized sequence to the plurality of user devices in the gameplay session, wherein presenting the recordings includes playing the recordings sequentially in accordance with the prioritized sequence.

* * * * *